United States Patent
Gao et al.

(10) Patent No.: US 9,830,935 B1
(45) Date of Patent: Nov. 28, 2017

(54) READ SENSOR CAPABLE OF PROVIDING MULTIPLE EFFECTIVE READ WIDTHS

(71) Applicant: Seagate Technology LLC, Cupertino, CA (US)

(72) Inventors: Kaizhong Gao, North Oaks, MN (US); Wenzhong Zhu, Apple Valley, MN (US); Edward Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/233,774

(22) Filed: Aug. 10, 2016

(51) Int. Cl.
G11B 5/39 (2006.01)
G11B 5/02 (2006.01)
G11B 5/127 (2006.01)
G11B 5/596 (2006.01)

(52) U.S. Cl.
CPC ............ *G11B 5/3906* (2013.01); *G11B 5/02* (2013.01); *G11B 5/1272* (2013.01); *G11B 5/59633* (2013.01)

(58) Field of Classification Search
None
See application file for complete search history.

(56) References Cited

U.S. PATENT DOCUMENTS

| | | | |
|---|---|---|---|
| 6,857,180 B2 * | 2/2005 | Horng | B82Y 10/00 216/22 |
| 7,010,848 B2 * | 3/2006 | Li | B32B 15/01 29/603.07 |
| 7,298,595 B2 | 11/2007 | Gill | |
| 7,400,475 B2 * | 7/2008 | Horng | B82Y 10/00 360/324.12 |
| 7,630,177 B2 | 12/2009 | Beach et al. | |
| 7,697,242 B2 | 4/2010 | Gill | |
| 7,751,156 B2 | 7/2010 | Mauri et al. | |
| 8,164,863 B2 | 4/2012 | Lin | |
| 8,289,663 B2 | 10/2012 | Zhang et al. | |
| 8,331,063 B2 | 12/2012 | Hara et al. | |
| 8,791,534 B2 * | 7/2014 | Fukami | G11C 11/14 257/421 |
| 8,824,106 B1 | 9/2014 | Garfunkel et al. | |
| 8,922,953 B1 | 12/2014 | Childress | |
| 8,988,812 B1 | 3/2015 | Brunnett et al. | |
| 9,040,178 B2 | 5/2015 | Zhao et al. | |
| 9,099,125 B1 | 8/2015 | Hattori et al. | |
| 9,401,162 B1 * | 7/2016 | Gao | G11B 5/3912 |

(Continued)

*Primary Examiner* — Will J Kilmowicz
(74) *Attorney, Agent, or Firm* — Westman, Champlin & Koehler, P.A.

(57) ABSTRACT

An apparatus that includes a read sensor having a bearing surface and first and second free layers that are separated by an intermediate structure. The first FL includes multiple segments, with each segment having a width at the bearing surface. A sum of the widths of different ones of the multiple segments is a first width of the first FL. The second FL is unsegmented and has a second width at the bearing surface that is different from the first width of the first FL. The read sensor also includes a first terminal connected to a first one of the multiple segments of the first FL, and a second terminal connected to a second one of the multiple segments of the first FL. A third terminal is connected to the second FL. Control circuitry applies a bias current from either the first or second terminal to the third terminal.

20 Claims, 13 Drawing Sheets

(56) References Cited

U.S. PATENT DOCUMENTS

| | | |
|---|---|---|
| 2004/0057162 A1 | 3/2004 | Gill |
| 2007/0188942 A1 | 8/2007 | Beach et al. |
| 2009/0109580 A1 | 4/2009 | Ayukawa et al. |
| 2009/0316309 A1 | 12/2009 | Partee et al. |
| 2012/0206830 A1 | 8/2012 | Gao et al. |
| 2013/0003228 A1 | 1/2013 | Sapozhnikov |
| 2013/0161770 A1 | 6/2013 | Meng et al. |
| 2013/0314816 A1 | 11/2013 | Gao et al. |
| 2014/0268428 A1 | 9/2014 | Dimitrov et al. |

* cited by examiner

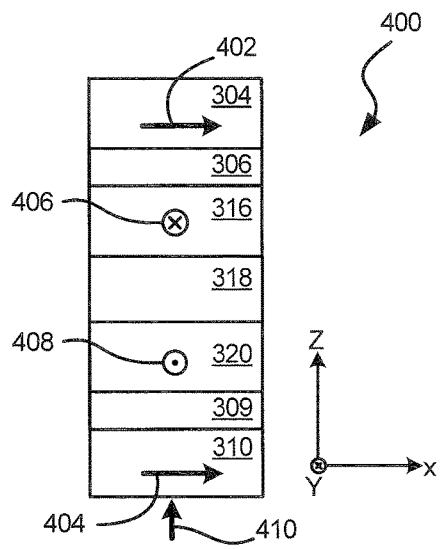
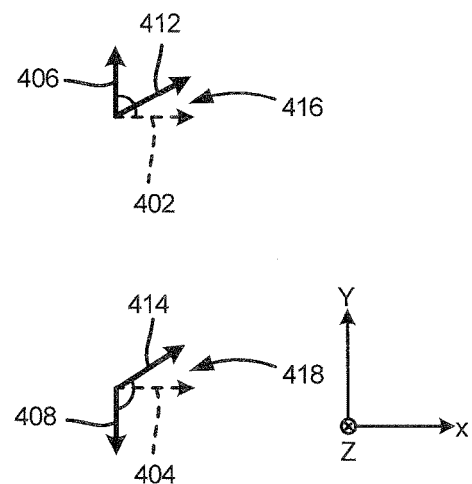
FIG. 4A
FIG. 4B
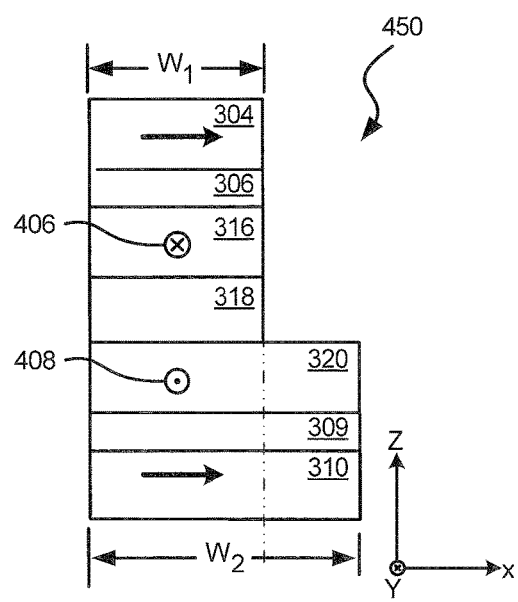
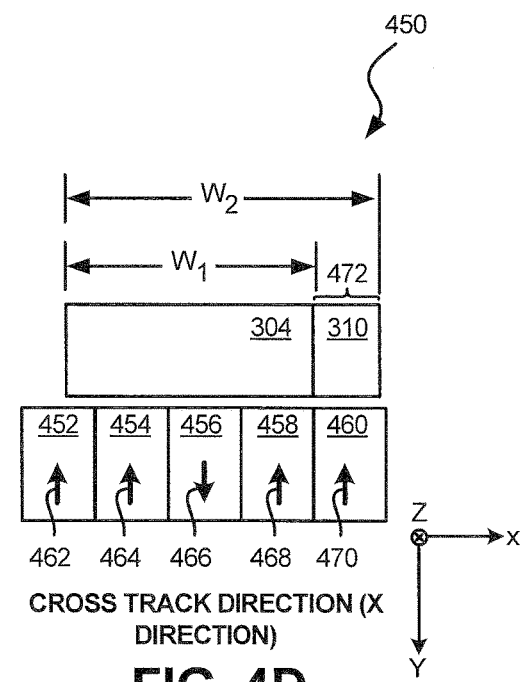
FIG. 4C
FIG. 4D

READ SENSOR CAPABLE OF PROVIDING MULTIPLE EFFECTIVE READ WIDTHS

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities. However, many read transducer designs are such that the read transducers have to be scaled to substantially fit the dimensions of narrow data tracks in disc drives having a high recording density. Electronic and/or magnetic noise may increase with a reduction in read transducer size/volume to fit the dimensions of the narrow data tracks.

SUMMARY

The present disclosure provides reader embodiments in which an overall size/volume of the reader is not directly dependent upon the dimensions of, or the spacing between, data tracks. Further, some reader embodiments are capable of providing multiple effective read widths. In one apparatus embodiment, a read sensor includes a bearing surface and first and second free layers that are separated by an intermediate structure. The first FL includes multiple segments, with each segment having a width at the bearing surface. A sum of the widths of different ones of the multiple segments is a first width of the first FL. The second FL is unsegmented and has a second width at the bearing surface that is different from the first width of the first FL. The read sensor also includes a first terminal connected to a first one of the multiple segments of the first FL, and a second terminal connected to a second one of the multiple segments of the first FL. A third terminal is connected to the second FL. The apparatus also includes control circuitry configured to apply a bias current from either the first terminal or the second terminal to the third terminal.

Other features and benefits that characterize embodiments of the disclosure will be apparent upon reading the following detailed description and review of the associated drawings.

BRIEF DESCRIPTION OF THE DRAWINGS

FIG. 4A-4D are diagrammatic illustrations that collectively illustrate a principle of operation of the magnetic reproducing device of FIGS. 3A and 3B.

DETAILED DESCRIPTION OF ILLUSTRATIVE EMBODIMENTS

Magnetic reproducing device embodiments described below have an overall size/volume that is not directly dependent upon the dimensions of, or the spacing between, data tracks on a data storage medium with which the reproducing device or reader interacts. Further, some reproducing device embodiments are capable of providing multiple effective read widths. Prior to providing additional details regarding the different embodiments, a description of an illustrative operating environment is provided below.

Figure 1A:
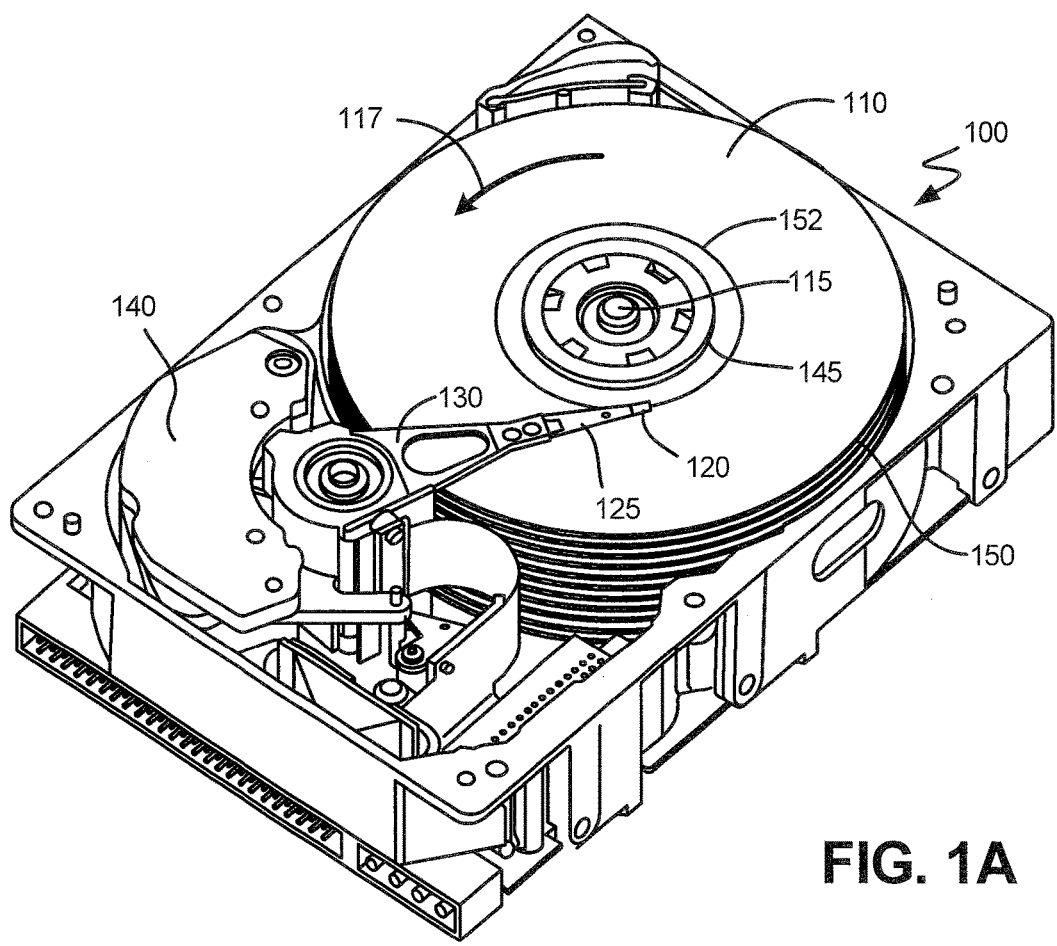
FIG. 1A is a perspective view of a data storage system.
Figure 1B:
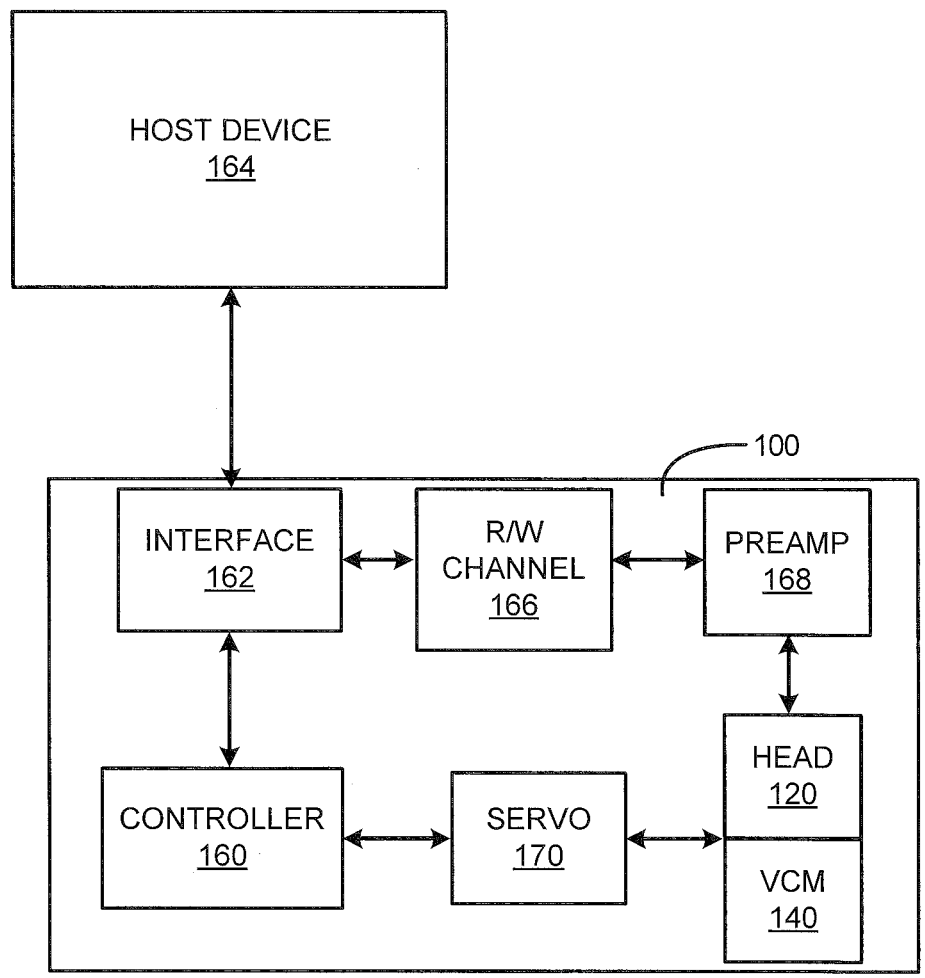
FIG. 1B is a generalized functional block diagram of a data storage system.

FIGS. 1A and 1B together show an illustrative operating environment in which certain specific embodiments disclosed herein may be incorporated. The operating environment shown in FIGS. 1A and 1B is for illustration purposes only. Embodiments of the present disclosure are not limited to any particular operating environment such as the operating environment shown in FIGS. 1A and 1B. Embodiments of the present disclosure are illustratively practiced within any number of different types of operating environments.

FIG. 1A is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 1B is a generalized block diagram of illustrative control circuitry for the device shown in FIG. 1A. The control circuitry includes a processor or controller 160 that directs or manages the high level operations of device 100. An interface circuit 162 facilitates communication between device 100 and a host device 164. A read/write channel 166 operates in conjunction with a preamplifier/driver circuit (preamp) 168 to write data to and to read data from a data storage medium such as medium 110 in FIG. 1A. Preamp 168 also optionally acts as a power supply to electrical components included in a recording head such as a read transducer, a write transducer, heaters, etc. Preamp 168 is illustratively electrically connected to recording head 120 through a HGA circuit that is connected to preamp 168 and to one or more recording head 120 electrical connection points. A servo circuit 170 provides closed loop positional control for voice coil motor 140 that positions recording head 120. Details regarding elements of a head such as 120 are provided below in connection with FIG. 2.

Figure 2:
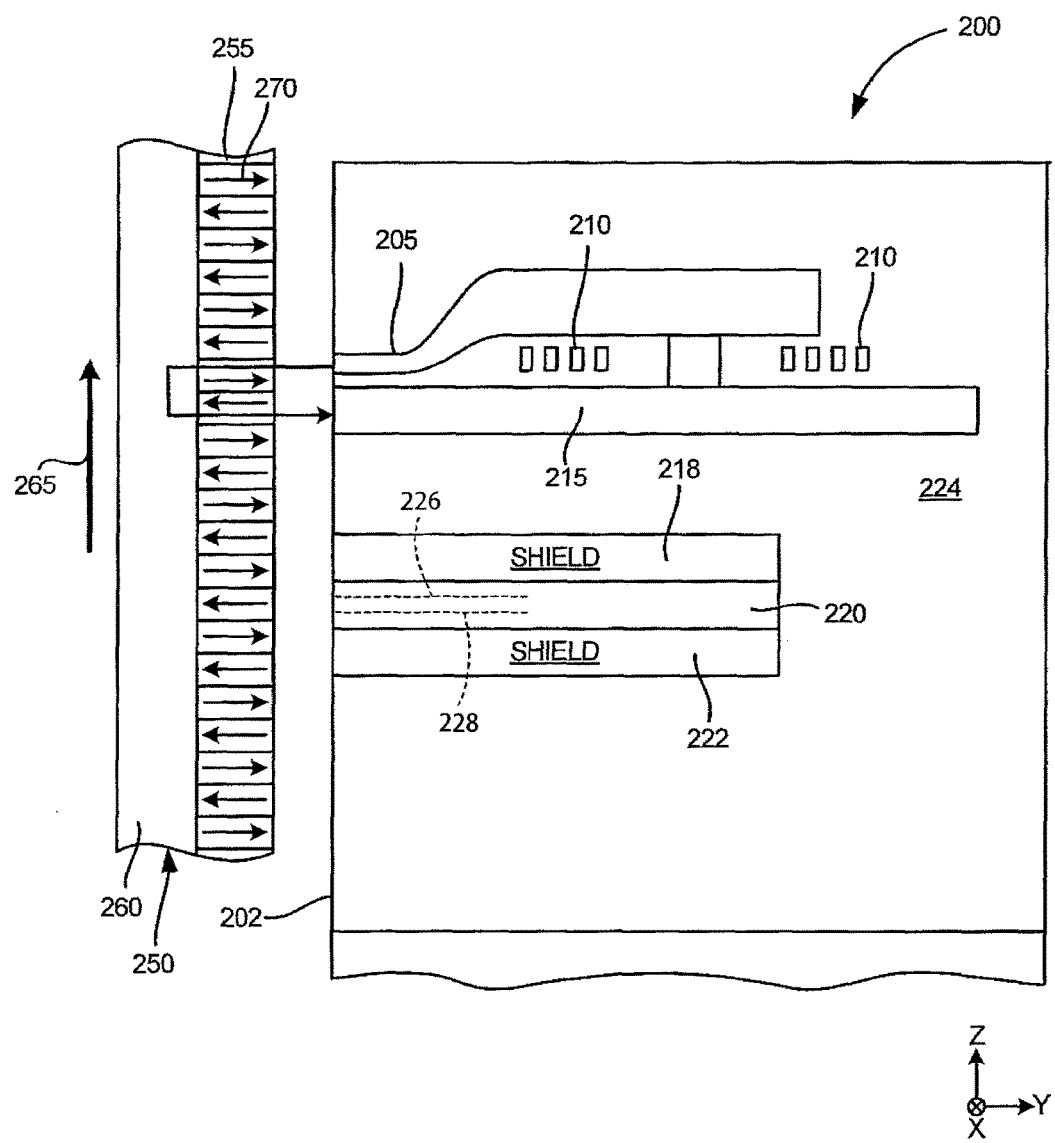
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 120 in FIG. 1A. Medium 250 is illustratively a data storage medium such as medium 110 in FIG. 1A. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 117 in FIG. 1A.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
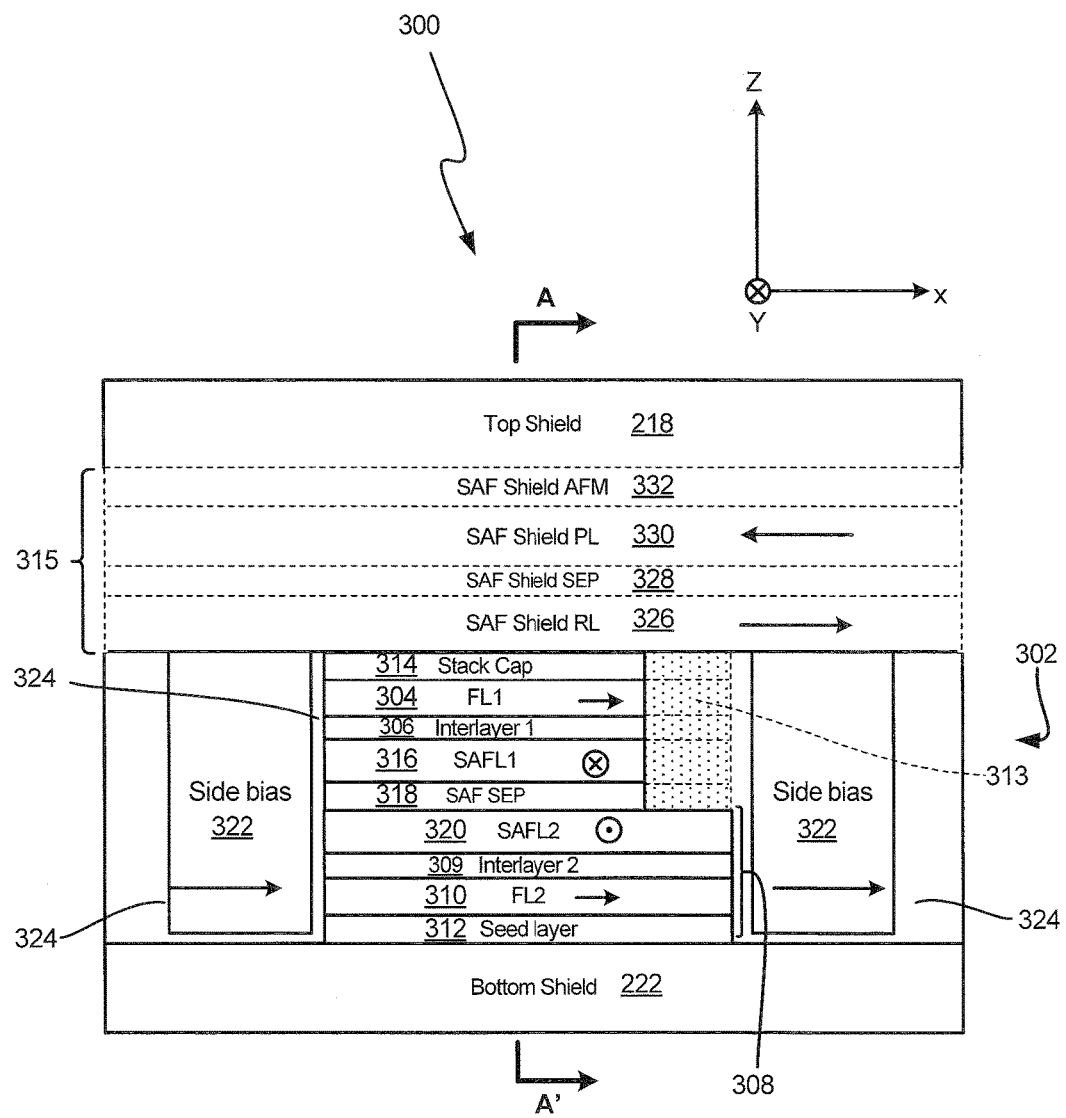
FIG. 3A is a bearing surface view of a magnetic reproducing device including a read sensor having multiple free layers of differing widths at the bearing surface.
Figure 3B:
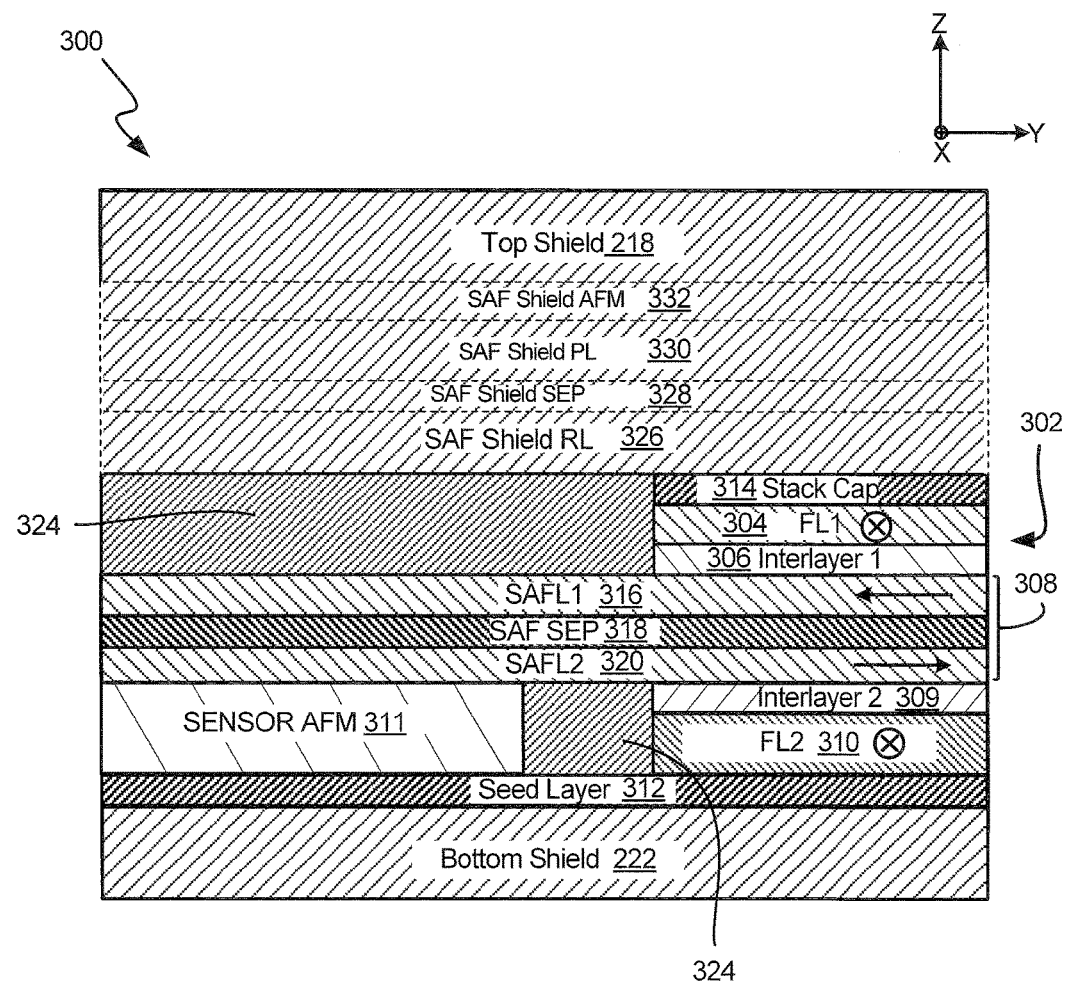
FIG. 3B is a sectional view of the magnetic reproducing device of FIG. 3A.

To address the earlier-noted challenges, read transducer 220 includes multiple sensing layers or free layers 226 (FL1) and 228 (FL2). As will be described further below, the free layers 226 and 228 have differing widths at the bearing surface 202, and are configured to provide a reader resolution that corresponds to a difference between a first width of the first free layer 226 and a second width of the second free layer 228. The first and second widths of respective free layers 226 and 228 may be substantially independent of a width of a track and/or a spacing between adjacent tracks. Accordingly, an overall size/volume of the read transducer 220 is not directly dependent upon the dimensions of, or the spacing between, data tracks. It is also contemplated that, in some embodiments, more than two free layers having differing widths may be utilized. In the reader embodiments, free layers 226 and 228 may be stacked along a track direction (e.g., a z-direction in FIG. 2) or a track width direction that is perpendicular to the track direction (e.g., a cross-track direction, which is an x-direction in FIG. 2). A y-direction in FIG. 2 is then defined as a direction that is perpendicular to x and z simultaneously, which is a stripe-height direction. In the embodiment show in FIG. 2, free layers 226 and 228 are stacked along the track direction. A bearing surface view of one reader embodiment is described below in connection with FIG. 3A, and a sectional view of that reader embodiment is shown in FIG. 3B. Thereafter, a principle of operation of the reader of FIGS. 3A and 3B is described further below in connection with FIGS. 4A-4D. Additional reader embodiments are then described in connection with FIGS. 5A and 5B.

FIG. 3A is a schematic block diagram illustrating an example read head 300 including a magnetoresistive sensor 302 having multiple free layers of differing widths. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a first free layer (FL1) 304, a first interlayer 306, a synthetic ferromagnetic (SAF) structure 308, a second interlayer 309 and a second free layer (FL2) 310. Magnetoresistive sensor 302 may also include a seed layer 312 between the bottom shield 222 and the second free layer 310 and a cap layer 314 above the first free layer 304. A SAF shielding structure 315 may optionally be included above the cap layer 314. Dashed lines are used to represent elements within structure 315 to indicate that structure 315 is optional. The layers 306, 308 and 310 form an intermediate structure between the FL1 304 and FL2 306.

In the embodiment shown in FIG. 3A, the sensor SAF structure 308 includes a first ferromagnetic layer (SAFL1) 316, a thin separation layer 318, which may comprise a metal such as ruthenium (Ru) in some embodiments, and a second ferromagnetic layer (SAFL2) 320. The magnetic moments of each of SAFL1 316 and SAFL2 320 are not allowed to rotate under magnetic fields in the range of interest (for example, magnetic fields generated by the bits of data stored on the data discs). The magnetic moments of SAFL1 316 and SAFL2 320 are generally oriented normal to the plane (e.g., the y direction) of FIG. 3A and anti-parallel to each other. In some embodiments, sensor SAF structure 308 is stabilized using an antiferromagnetic (AFM) layer, which may be recessed behind the bearing surface. This is shown in FIG. 3B, which is a cross-sectional view of read head 300 of FIG. 3A through a plane orthogonal to the bearing surface and the layers of the reader stack (along line A-A' shown in FIG. 3A). In FIG. 3B, a recessed sensor AFM layer 311 is positioned below SAFL2 320 and recessed from the bearing surface 202. In reader 300, the unidirectional anisotropy due to the AFM layer 311 helps ensure that the polarity of the SAF (e.g., the magnetic orientations of SAFL1 316 and SAFL2 320 at zero external field) is suitably maintained. The recessed sensor AFM layer 311 may be formed using any suitable deposition technique. It should be noted that, in different embodiments, the recessed sensor AFM layer 311 may be in locations other than that shown in FIG. 3B as long as the recessed sensor AFM layer 311 is able to provide magnetic coupling to the SAF shielding structure 308. For example, recessed AFM layer 311 may be located above, and in contact with, SAFL1 316. In such an embodiment, insulator 324 above SAFL1 316 will be reduced in size to accommodate the recessed AFM layer 311. In certain embodiments, a recessed AFM layer above SAFL1 316 may be in addition to the recessed AFM 311 shown in contact with SAFL2 320 in FIG. 3B. It should also be noted that, in some embodiments, the AFM layer such as 311 may be eliminated. To allow for the elimination of the AFM layer such as 311, the pinning or stabilization functionality provided by the AFM layer has to be achieved/provided using a different technique. One different technique for stabilizing SAF shielding structure 308 is by uniaxial anisotropy induced by shape (for example, by employing different width and height dimensions for SAF 308). It should be noted that techniques other than shape anisotropy may be utilized to provide stabilization (e.g., self-pinning) in a SAF shielding structure such as 308. The techniques include film growth with a suitable aligning magnet and/or deposition of the film(s) at a controlled angle of incidence, suitable thermal annealing processes, etc.

Referring back to FIG. 3A, in one implementation, the first free layer 304 and the second free layer 310 are not exchange coupled to, for example, antiferromagnets. As a result, the magnetic moment of the first free layer 304 and the second free layer 310 are free to rotate under the influence of an applied magnetic field in a range of interest. The read head 300 may further include side biasing magnets or side shields 322, which produce a magnetic field that biases the first free layer 304 and the second free layer 310 with a magnetic moment parallel to the plane of the figure and generally oriented horizontally. This bias prevents the magnetic moment of the first free layer 304 and the second free layer 310 from drifting due to, for example, thermal energy, which may introduce noise into the data sensed by the read head 300. The bias is sufficiently small, however, that the magnetic moments of the first free layer 304 and the second free layer 310 can change in response to an applied magnetic field, such as a magnetic field of a data bit stored on the data discs. In some embodiments, the side biasing magnets or side shields 322 are formed of soft magnetic material (e.g., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, optional SAF shielding structure 315 includes a SAF shield reference layer 326, a thin SAF shield separation layer 328, which may comprise a metal such as Ru in some embodiments, a SAF shield pinned layer 330 and a SAF shield AFM layer 332. Because, in some embodiments, sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 315, side shields 322 may be stabilized by shape anisotropy, by employing hard magnetic layers adjacent to the soft magnetic layers within side shield 322, or by any other suitable technique.

In some embodiments, sensor 302 may utilize tunnel magnetoresistance (TMR) or giant magnetoresistance (GMR) effects. In the embodiments that utilize GMR effects, first interlayer 306 and second interlayer 309 are metallic layers. One or both interlayers 306 and 309 may comprise Cu or one or more Heusler alloys comprising at least one of Cu, Co, Mn, Ge, Ga, Fe, Si, Cr, Ag, Ti, Al, Sn, Mg, V, B, Pd, N, Ni or Pt. Further, one or both interlayers 306 and 309 may be multilayered structures. Examples of alloys (or combinations of alloys) that may be used to form single interlayers or different layers of the multilayered interlayer structures include: 1) $Cu_2MnAl$, $Cu_2MnIn$, $Cu_2MnSn$, $MnBi$; 2) $Ni_2MnAl$, $Ni_2MnIn$, $Ni_2MnSn$, $Ni_2MnSb$, $Ni_2MnGa$; 3) $Co_2MnAl$, $Co_2MnSi$, $Co_2MnGa$, $Co_2MnGe$; 4) $Pd_2MnAl$, $Pd_2MnIn$, $Pd_2MnSn$, $Pd_2MnSb$; 5) $Co_2FeSi$, $Co_2FeAl$; 6) $Fe_2Val$; and 7) $Mn_2VGa$, $Co_2FeGe$. In the embodiments that utilize TMR effects, first interlayer 306 and second interlayer 309 are tunneling barrier layers that may comprise MgO, for example. In such embodiments, each of the first barrier layer 306 and the second barrier layer 309 is sufficiently thin that quantum mechanical electron tunneling occurs between SAFL1 316 and first free layer 304 and between SAFL2 320 and second free layer 310. The electron tunneling is electron-spin dependent, making the magnetic response of the magnetoresistive sensor 302 a function of the relative orientations and spin polarizations of SAFL1 316 and first free layer 304 and SAFL2 320 and second free layer 310. Additionally, in magnetoresistive sensor 302, different sensing layers have different widths to impact an overall resolution of sensor 302. Specifically, magnetoresistive sensor 302 is formed such that first free layer 304, first interlayer 306 and SAFL1 316 have a first width that is different from a second width of second free layer 310, second interlayer 309 and SAFL2 320. The different widths may be achieved by employing a suitable milling process or by an ion deposition technique. In FIG. 3A, region 313, which includes dashed and dotted lines, is where a process such as milling or ion deposition is carried out for width reduction or destruction of magnetic moments. It should be noted that the width reduction can be carried out in any suitable location in different embodiments. Also, region 313 is shown to extend from a top of stack cap 314 to a bottom of SAF separation layer 318 in FIG. 3A. However, in different embodiments, region 313 may extend from cap 314 to any suitable depth (for example, only to the bottom of layer 304 (or top of layer 306), all the way down to the bottom of interlayer 309 (or top of layer 310), or anywhere in between). A resolution of reader 300 corresponds to a difference between the first and second widths of the elements of sensor 320. This is explained below in connection with FIGS. 4A-4D.

FIG. 4A is a schematic illustration showing a bearing surface view a sensor stack 400 in which multiple sensing elements of a same width are employed. As can be seen in FIG. 4A, first free layer 304 and second free layer 310 are magnetized in a same horizontal direction indicated by arrows 402 and 404, respectively. The magnetic moments of SAFL1 316 and SAFL2 320 are oriented normal to the plane (e.g., the y direction) of FIG. 4A and anti-parallel to each other. The magnetization directions of SAFL1 316 and SAFL2 320 are denoted by reference numerals 406 and 408, respectively. Arrow 410 denotes an external magnetic field (for example, form a magnetized bit on a data storage medium) that is vertical and in an upward direction. As noted above, the magnetic moment of the first free layer 304 and the second free layer 310 are free to rotate under the influence of an applied magnetic field in a range of interest. Also, as noted above, the magnetic moments of each of SAFL1 316 and SAFL2 320 are not allowed to rotate under magnetic fields in the range of interest. Thus, when the external field denoted by arrow 410 acts on sensor 400, changes in magnetization directions of first free layer 304 and second free layer 310 take place in a manner shown in FIG. 4B, which is a top-down view of the different magnetization directions of layers within sensor stack 400. In FIG. 4B, the dashed arrows represent the horizontal magnetization directions 402 and 404 of the first free layer 304 and second free layer 310, respectively, when those layers are not under the influence of external field 410. Solid arrows 412 and 414 represent the magnetization directions of first free layer 304 and second free layer 310, respectively, when their magnetizations are rotated under the influence of external field 410 (e.g., 412 is 402 in a rotated state and 414 is 404 in a rotated state). As can be seen in FIG. 4B, angle 416 represents a decrease in an angle between arrows 402 and 406 as a result of external field 410, and angle 418 represents an increase in an angle between arrows 404 and 408 as a result of external field 410. Since angles 416 and 418 are substantially equal and in opposite directions relative to the magnetization directions 406 and 408, respectively, the response of one of the free layer 304 and 310 is cancelled by the response of the other one of free layers 304 or 310. However, it is found that, if one of the free layers 304 and 310 is wider that the other one of the free layers 304 and 310 at the bearing surface, then the overall response of the sensor corresponds to a difference between the widths of the respective free layers. This is illustrated in FIG. 4C, which shows a bearing surface view of a sensor 450 in which a first width ($W_1$) of the first free layer 304 is less than a second width ($W_2$) of the second free layer 310. The response of sensor 450 corresponds to a difference between $W_1$ and $W_2$. FIG. 4D illustrates how a sensor such as 450 senses bits on tracks of a data storage medium. In FIG. 4D, bits on 5 adjacent tracks (452, 454, 456, 458 and 460) are schematically shown in a cross-track direction (e.g., the x direction). If a track pitch or track width of each of tracks 452, 454, 456, 458 and 460 is about 20 nanometers (nm), then a sensor that is capable of separately reading a bit such as 462, 464, 466, 468 or 470 needs to have a resolution that corresponds to the 20 nm track pitch. As can be seen in FIG. 4D, although sensor 450 is substantially wider than 20 nanometers, portions of sensor 450 where there is an overlap between $W_1$ and $W_2$ produces no read response and only non-overlapping portion 472 provides the response of reader 450. In other words, signals sensed by reader 450 from bits 462, 464, 466 and 468 are cancelled within reader 450, thereby providing a sensed output for only bit 470. Thus, sensor 450 can have an overall size/volume that is not directly dependent upon the dimensions of, or the spacing between, data tracks on a data storage medium with which read sensor 450 interacts.

In the embodiments described above, both the first free layer 304 and the second free layer 310 are substantially continuous layers. However, in some embodiments at least one of the first free layer 304 or the second free layer 310 may be split into multiple segments.

Figure 5A:
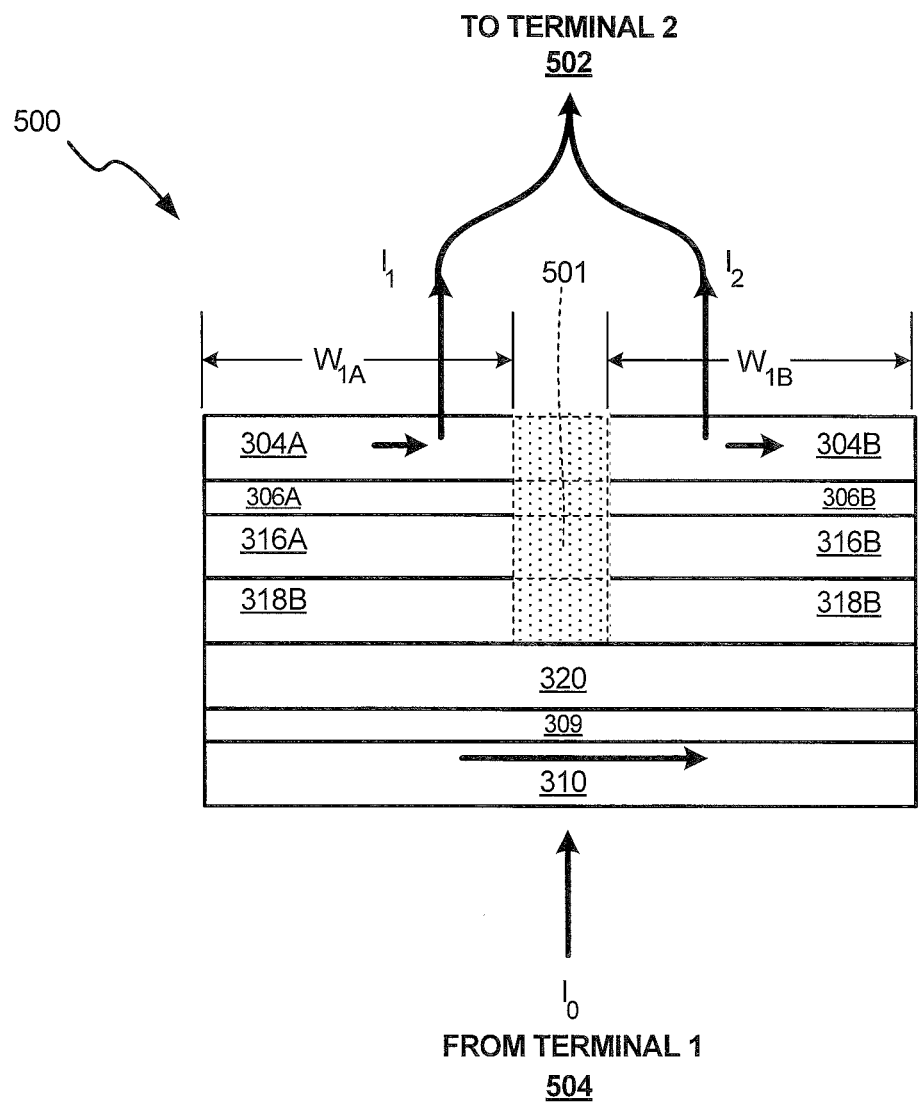
FIGS. 5A and 5B are bearing surface views of a magnetic reproducing device in accordance with another embodiment.
Figure 5B:
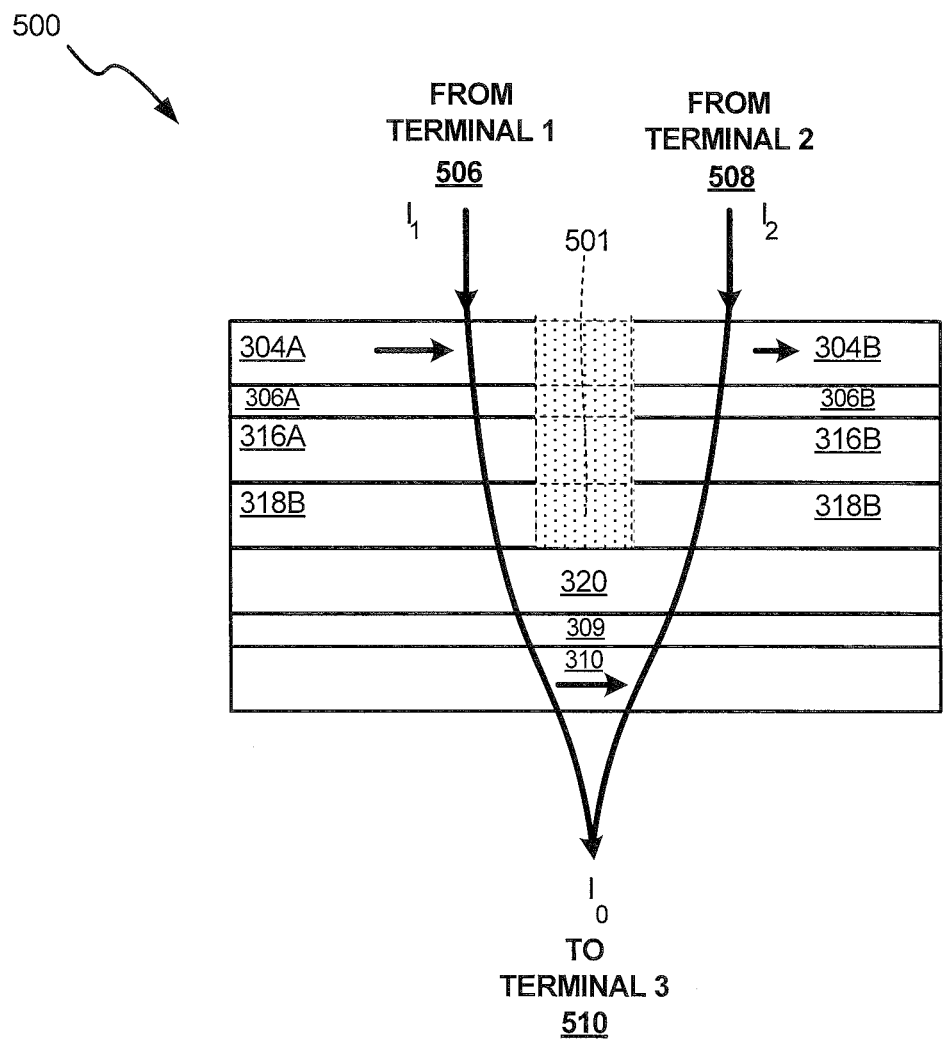

FIGS. 5A and 5B are bearing surface views of sensor 500 that show the first free layer split into multiple segments. Specifically, in sensor 500, the first free layer is split into two separate segments 304A and 304B. The splitting of the first free layer into the first segment 304A and the second segment 304B is carried out using any suitable technique (for example, by a suitable milling process or by an ion deposition technique). As shown in FIGS. 5A and 5B, other layers of sensor 500 may be split into first and second segments. For example, the first interlayer may be split into segments 316A and 316B, SAFL1 may be split into segments 316A and 316B and the separation layer may be separated into segments 318A and 318B. In the embodiment of FIGS. 5A and 5B, region 501, which includes dashed and dotted lines, is where a process such as milling or ion deposition is carried out for width reduction by splitting. Region 501 is shown to extend from a top of layer 304A, 304B to a bottom of SAF separation layer 318A, 318B, in FIGS. 5A and 5B. However, in different embodiments, region 510 may extend from the top layer 304A, 304B (or from the top of a stack cap such as 314 (not shown in FIGS. 5A and 5B) to any suitable depth (for example, only to the bottom of layer 304A, 304B (or top of layer 306A, 306B), all the way down to the bottom of interlayer 309 (or top of layer 310), or anywhere in between). As can be seen in FIG. 5A, segment 304A has a width $W_{1A}$ and segment 304B has a width $W_{1B}$, which may be equal to, or different from, $W_{1A}$ in different embodiments. Also, as can be seen in FIG. 5A, a sum of widths $W_{1A}$ and $W_{1B}$ is less than width $W_2$. In the embodiment of FIG. 5A, both segments 304A and 304B are electrically coupled to a same reader terminal (Terminal 2) 502 and the second free layer 310 is electrically coupled to a single reader terminal (Terminal 1) 504, thereby forming a two-terminal reader. In the two-terminal reader of FIG. 5A, current $I_0$ is showing entering sensor 500 through the second free layer 310 and splitting into components $I_1$ and $I_2$, which are joined at terminal 502. In FIG. 5B, first segment 304A is electrically coupled to a first reader terminal (Terminal 1) 506, second segment 304B is coupled to a second reader terminal (Terminal 2) 508 and the second free layer 310 is coupled to a third reader terminal (Terminal 3) 510, thereby form a three-terminal reader. In the three-terminal reader, currents $I_1$ and $I_2$ are shown entering segments 304A and 304B from respective reader terminals 506 and 508. Currents $I_1$ and $I_2$ are joined at reader terminal 510 to provide a combined current $I_0$.

Since, in the above-described embodiments, the first free layer 304 interacts with a data storage medium to provide a first sensed signal and the second free layer 310 interacts with the data storage medium to provide a second sensed signal, a two-dimensional read signal is obtained in the read sensor. As described above, an interaction between the first sensed signal and the second sensed signal takes place within the reader, and a final out signal is provided. In contrast, in conventional two-dimensional readers, two separate sensed signals are obtained from two separate read sensors, which may be electrically isolated from each other, and the separate sensed signals are combined using circuitry connected externally to the individual sensors. Thus, embodiments of the present disclosure provide a two-dimensional sensor that inherently (e.g., without circuitry external to the sensor) produces a two-dimensional sensed signal and resolves the two sensed signal components within the sensor to provide a sensor output.

Figure 6:
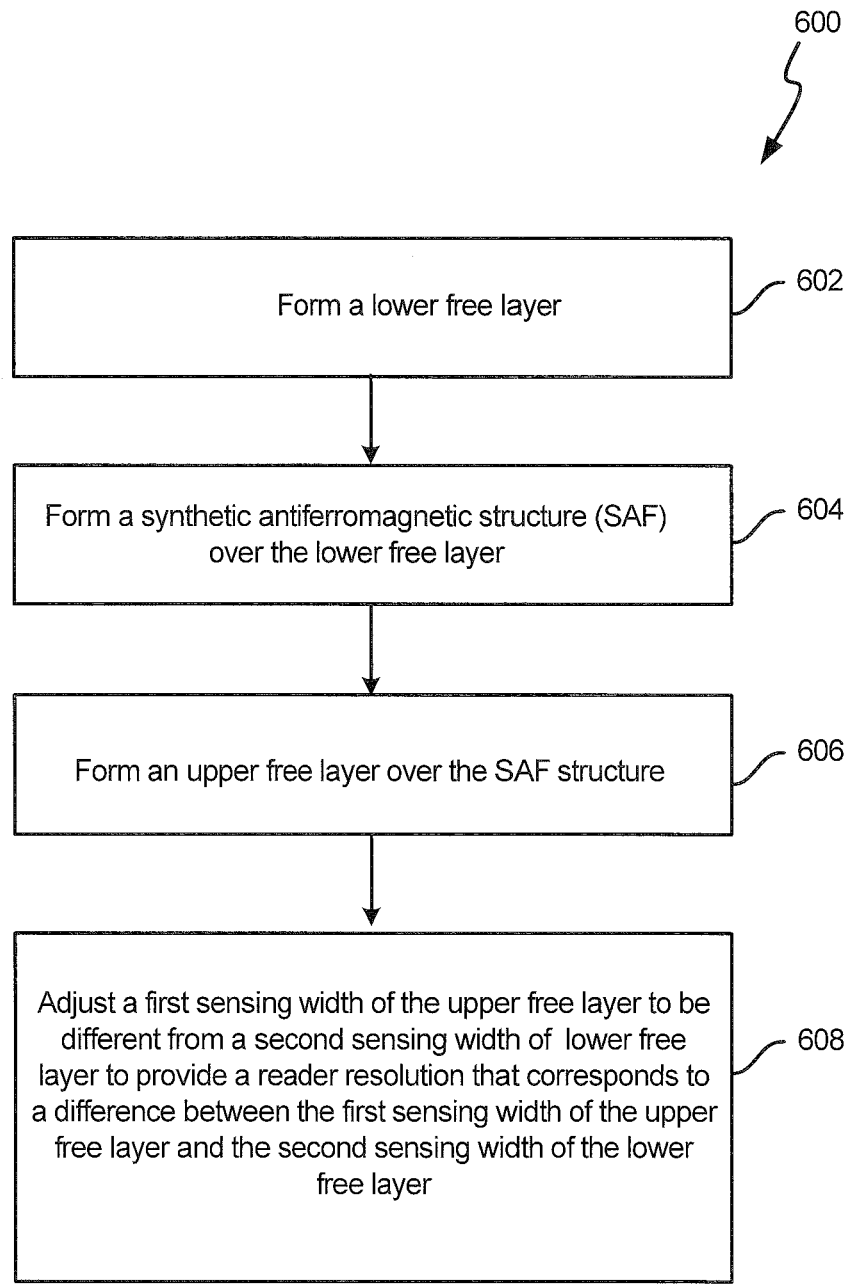
FIG. 6 is a simplified flow diagram of one method embodiment.

FIG. 6 shows a simplified flow diagram 600 of a method of forming a read sensor in accordance with one embodiment. At step 602, a second or lower free layer is formed. At step 604, a synthetic antiferromagnetic (SAF) structure is formed over the lower free layer. This is followed by step 606 at which an upper or first free layer is formed over the SAF structure. At step 608, a first sensing width of the first or upper free layer is adjusted to be different from a second sensing width of the second or lower free layer to provide a reader resolution that corresponds to a difference between the first sensing width of the first or upper free layer and the second sensing width of the second or lower free layer. It should be noted that the read sensor may include several additional layers formed between, above and/or below the layers formed in steps 602, 604 and 606.

As described above in connection with FIGS. 5A and 5B, in some embodiments, at least one of the first free layer 304 or the second free layer 310 may be split into multiple segments. Accordingly, in the embodiment shown in FIGS. 5A and 5B, the first free layer 304 of sensor 500 is split into two separate segments 304A and 304B. In FIG. 5B, first terminal 506 is connected to segment 304A, second terminal 508 is connected to segment 304B and third terminal 510 is connected to second free layer 310. Further, in the embodiment of FIG. 5B, components ($I_1$ and $I_2$) of bias current ($I_0$) may be applied from the respective first and second terminals 506 and 508 to the third terminal 510. As indicated earlier, in such an embodiment, the effective read width of sensor 500 is equal to the difference between the width of the second free layer 310 ($W_2$) and the width of the first free layer 304 (e.g., width $w_{1A}$ of segment 304A plus width $w_{1B}$ of segment 304B). However, in some embodiments, the bias current may be applied from either the first terminal 506 or the second terminal 508 to the third terminal 510. As will be described below in connection with FIG. 7, in such an embodiment, the effective read width of sensor 500 will increase when the bias current is applied to only one of terminals 506 or 508.

Figure 7:
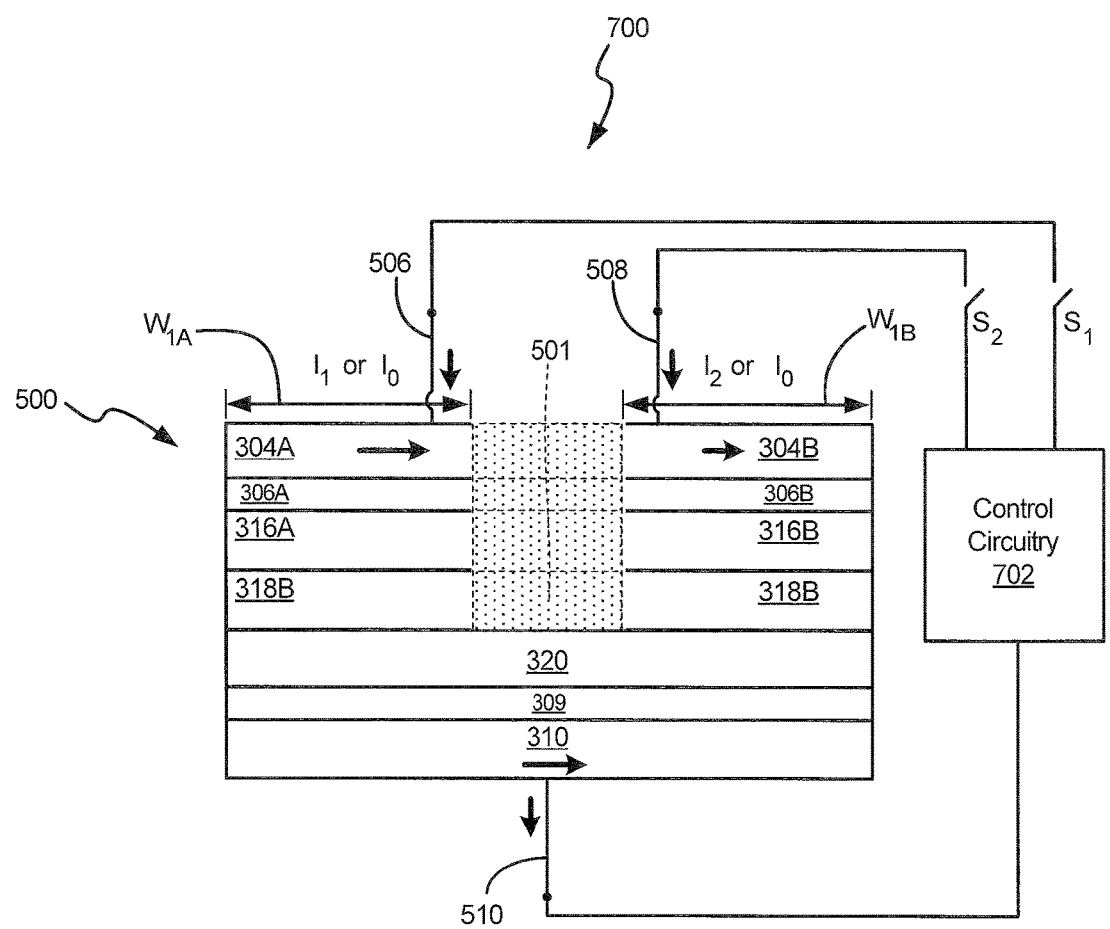
FIG. 7 illustrates a data reproducing system in which a bias current may be selectively applied to different free layer segments in accordance with one embodiment.

FIG. 7 illustrates a data reproducing system 700 in which the bias current may be selectively applied to different free layer segments in accordance with one embodiment. System 700 shows read sensor 500 and control circuitry 702 coupled to the read sensor 500. Reader 500 and control circuitry 702 may be a part of disc drive 100. Further, control circuitry 702 may comprise components such as controller 160 and preamplifier 168 shown in FIG. 1B. Switches $S_1$ and $S_2$ are included in FIG. 7 to indicate that multiple options for applying a bias current to the read sensor 500 are provided in system 500. In some embodiments, circuitry and/or firmware within controller 160 and preamplifier 168 may be configured to provide the multiple options for applying a bias current to the read sensor 500. In general, the multiple biasing options may be provided in any suitable manner.

In the embodiment of FIG. 7, if $S_1$ and $S_2$ are in a closed position, the resulting configuration is equivalent to that shown in the embodiment in FIG. 5B where components $I_1$ and $I_2$ of the bias current may applied via terminals 506 and 508, respectively, to the third terminal 510. As noted above, in such a connection configuration, the effective read width of sensor 500 is equal to $W_2-W_{1A}-W_{1B}$. If $S_1$ is open and $S_2$ is closed, for example, the bias current $I_0$ is applied via second terminal 508 to third terminal 510. In such a configuration, first segment 304A is inactive and therefore does not produce a sensed signal output. Thus, the effective read width of sensor 500 in this configuration is equal to $W_2-W_{1B}$. Similarly, if $S_2$ is open and $S_1$ is closed, the effective read width of sensor 500 is equal to $W_2-W_{1A}$. Therefore, the effective read width of sensor 500 is wider when $S_1$ or $S_2$ is open than when both $S_1$ and $S_2$ are closed. In the embodiment of FIG. 7, $W_{1A}$ and $W_{1B}$ are shown as being substantially equal. Thus, in such an embodiment, $W_2-W_{1B}$ is substantially equal to $W_2-W_{1A}$. This makes the embodiment of FIG. 7 capable of providing two effective read widths for sensor 500. The capability of providing two effective read widths enables data reproducing system 700 to read tracks of two different widths. For example, a data storage medium such as 110 (of FIG. 1) may employ a first relatively wide read width for servo tracks and a second relatively narrow read width for data tracks. In such an embodiment, the servo tracks may be read when one of $S_1$ or $S_2$ is open and the other one of $S_1$ or $S_2$ is closed. The data tracks may be read when both $S_1$ and $S_2$ are closed. It should be noted that, in different embodiments, any suitable bias currents may be applied to terminals 506 and/or 508.

In one embodiment, fabrication of read sensor 500 is carried out such that first segment 304A has a first target width TW1 and the second segment 304B has a second target width TW2. One target width (for example, TW1) is selected to be slightly wider than an optimal or median target width and the other target width (for example, TW2) is selected to be slightly narrower than the median target width. In such an embodiment, if the fabrication process drifts wider, the segment (for example, 304B) formed with the selected narrower target width (for example, TW2) will have an actual width ($W_{1B}$) that is closer to the median target width. Similarly, if the fabrication process drifts narrower, the segment (for example, 304A) formed with the selected wider target width (for example, TW1) will have an actual width that is closer to the median target width. A segment (304A or 304B) closest to the median target width may be selected to apply the bias current. By selecting the segment closest to the median target width, an effective wide read width sigma or standard deviation reduction is achieved. Since one segment's target width is selected to be slightly narrower than the median target width and the other segment's target width is selected to be slightly wider than the median target width, the sum of the actual read widths ($W_{1A}+W_{1B}$) of segments 304A and 304B ($W_{1A}+W_{1B}$) formed by this method will not be altered substantially by using this fabrication method.

Figure 8:
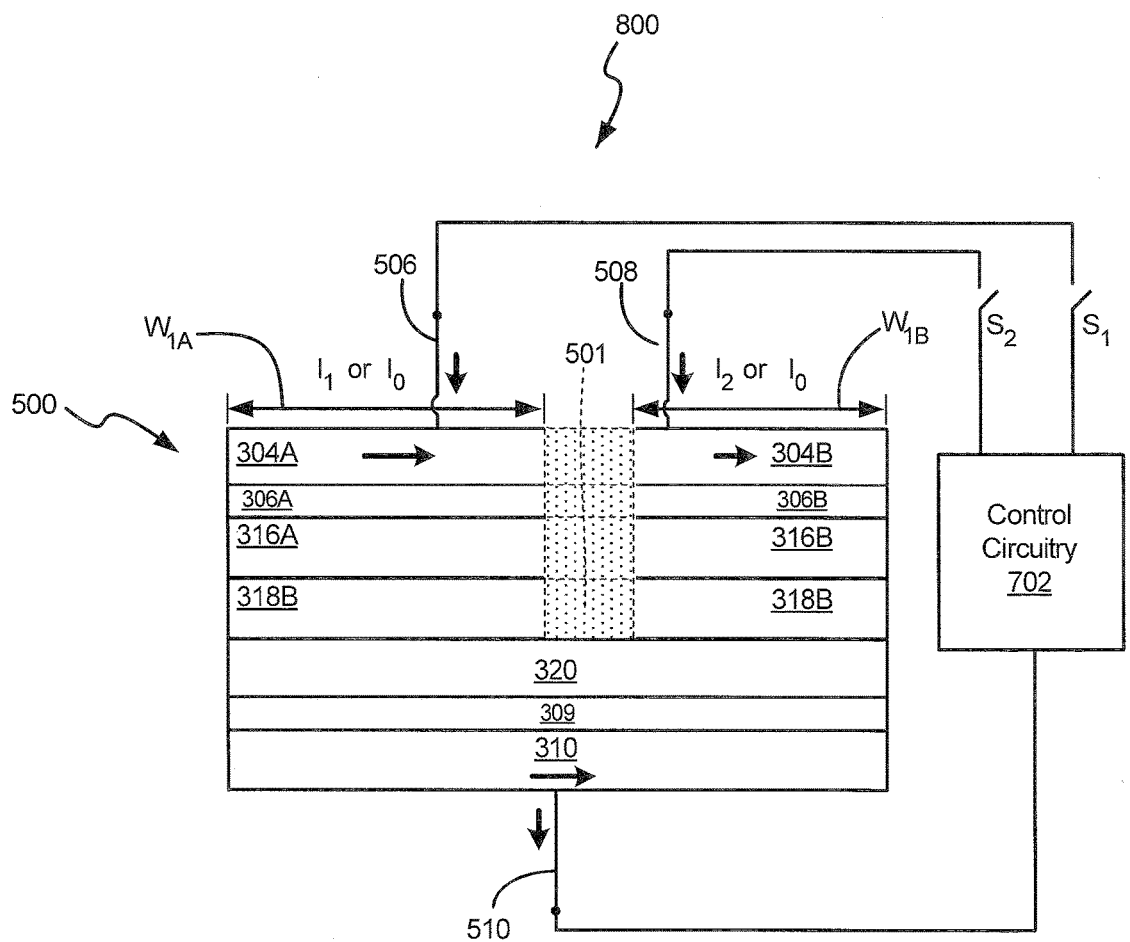
FIG. 8 illustrates a data reproducing system in which a bias current may be selectively applied to different free layer segments in accordance with another embodiment.

FIG. 8 illustrates a data reproducing system 800 in which the bias current may be selectively applied to different free layer segments in accordance with another embodiment. Data reproducing system 800 is substantially similar to data reproducing system 700 described above in connection with FIG. 7. However, instead of employing segments 304A and 304B of substantially a same with as in the case of system 700, sensor 500 of system 800 employs segments of different widths. In the example shown in FIG. 8, width $W_{1A}$ of first segment 304A is greater than width $W_{1B}$ of second segment 304B. It should be noted that, in other embodiments $W_{1B}$ may be greater than $W_{1A}$.

In the embodiment of FIG. 8, since $W_{1A}$ is greater than $W_{1B}$, $W_2-W_{1B}$ is greater than $W_2-W_{1A}$. Therefore, data reproducing system 800 is capable of operating in three different configurations, each of which provides a different effective read width of sensor 500. Specifically, when both $S_1$ and $S_2$ are closed, the narrowest effective read width of $W_2-W_{1A}-W_{1B}$ is provided for sensor 500. When $S_1$ is open and $S_2$ is closed, the widest effective read width of $W_2-W_{1B}$ is provided for sensor 500. When $S_2$ is open and $S_1$ is closed, an intermediate read width of $W_2-W_{1A}$ is provided for sensor 500. The three different effective read widths for sensor 500 may be useful for reading information in disc drives that employ interlaced magnetic recording (IMR). A disc that includes IMR tracks is described below in connection with FIG. 9.

Figure 9:
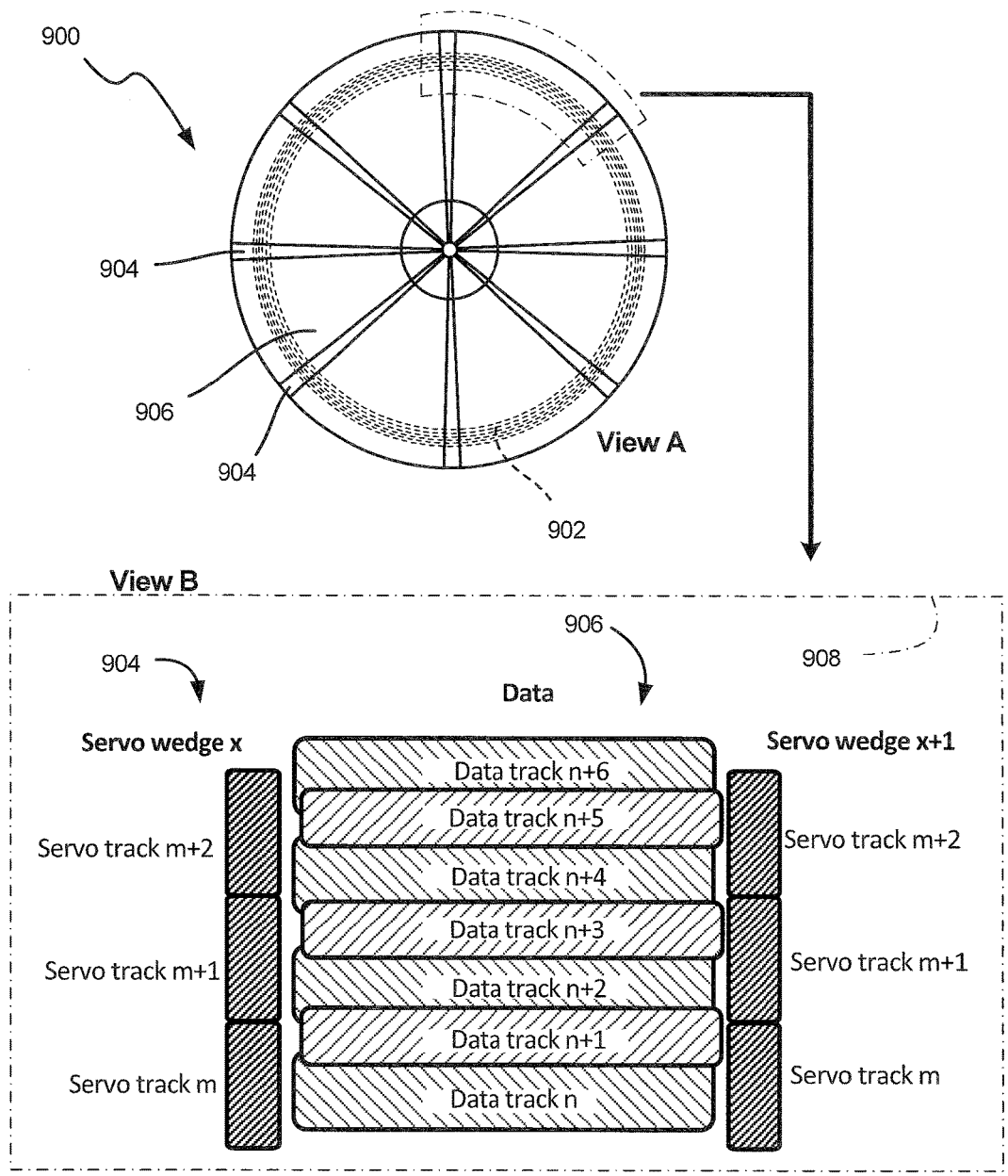
FIG. 9 is a diagrammatic illustration of a surface of a disc that includes interlaced magnetic recording tracks.

FIG. 9 is a diagrammatic illustration of a surface of a disc 900 that includes IMR tracks. As illustrated in View A of FIG. 9, the surface of disc 900 includes tracks 902. It should be noted that, although a small number of tracks 902 are shown as covering a small portion of the surface of disc 900 in the interest of simplification, in general, the disc surface is substantially fully covered by a large number of tracks. Also, as shown in FIG. 9, the surface of disc 900 includes a plurality of servo wedges 904 with data fields 906 between the servo wedges 904.

View B of FIG. 9 illustrates a magnified view 908 of a portion of tracks 902. The magnified view 908 includes servo wedges x and x+1 with data fields (or data track portions) 906 between the respective servo wedges. Servo wedges x and x+1 include servo tracks m, m+1 and m+2. In general, IMR utilizes alternating data tracks of different written track widths arranged with slightly overlapping written track boundaries so that a center-to-center distance between directly adjacent tracks (e.g., the track pitch) is substantially uniform across the surface of the disc 900. For example, the IMR technique shown in the magnified view 908 illustrates alternating data tracks of two different written track widths. A first series of alternating tracks (e.g., the tracks n, n+2, n+4 and n+6) have a wider written track width $WT_1$ than a second series of interlaced data tracks (e.g., n+1, n+3 and n+5) that have a narrower track width $WT_2$.

In the magnified view 908, each wide data track of the first series is written before the narrow and directly adjacent data tracks of the second series. For example, the data track n+2 is written before data is written to either of the data tracks n+1 and n+3. Data writes to the data tracks n+1 and n+3 overwrite outer edge portions of the data track n+2; however, the data track n+2 is still readable due to sufficient information retained in a center region of the data track n+2. Because each data track of wide written track width is written prior to directly adjacent data tracks of narrower written track width, the data tracks of the wider written track width (e.g., data tracks n, n+2, n+4 and n+6) are also referred to herein as "bottom tracks," while the alternating data tracks of narrower written width (e.g., the data tracks n+1, n+3 and n+5) are referred to herein as "top tracks." Also, before the top tracks are written, the bottom tracks are referred to herein as "unsqueezed bottom tracks," indicating that the written bottom tracks are not yet "squeezed" by the top tracks.

As noted above, the data reproducing system 800 (of FIG. 8) is useful for reading information in disc drives that employ interlaced magnetic recording (IMR). Specifically, in one embodiment, the widest effective read width provided in system 800 may be employed to read the servo tracks such as m, m+1 and m+2, which are the widest tracks shown in magnified view 908 (of FIG. 9). The intermediate effective read width provided in system 800 may be utilized to read unsqueezed bottom tracks such as n, n+2, n+4 and n+6 before top tracks such as n+1, n+3 and n+5 are written, and the narrowest effective read width provided in system 800 may be utilized to read to tracks such as n+1, n+3 and n+5.

Figure 10:
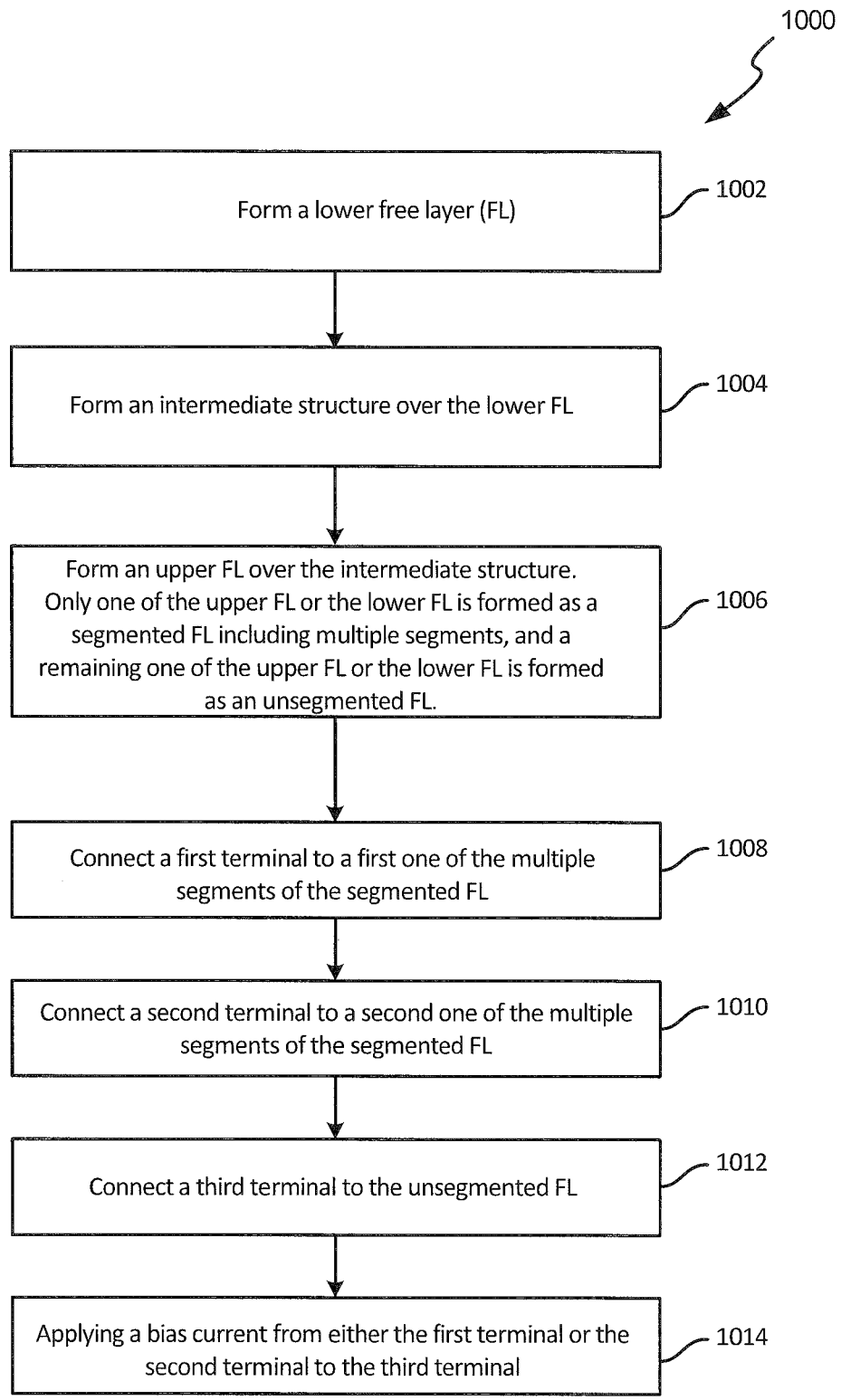
FIG. 10 is a simplified flow diagram of another method embodiment.

FIG. 10 shows a simplified flow diagram 1000 in accordance with another embodiment. The method involves forming a read sensor in accordance with steps 1002-1012. At step 1002 a lower FL is formed. At step 1004, an intermediate structure is formed over the lower FL. This is followed by step 1006 at which an upper FL is formed over the intermediate structure. Only one of the upper FL or the lower FL is formed as a segmented FL including multiple segments, and a remaining one of the upper FL or the lower FL is formed as an unsegmented FL. At step 1008, a first terminal is connected to a first one of the multiple segments of the segmented FL. At step 1010, a second terminal is connected to a second one of the multiple segments of the segmented FL. At step 1012, a third terminal is connected to the unsegmented FL. At step 1014, a bias current is applied from either the first terminal or the second terminal to the third terminal.

It should be noted that servo tracks are typically written by a multi-disc servo track writer. In general, in current disc drives, a reader having a single width is utilized to read both servo and data fields. Thus, the servo tracks written by the multi-disc servo track writer for current disc drives need to have widths that correspond to the data track widths, which are relatively narrow. Writing relatively narrow servo tracks is both unnecessary and time consuming. Providing the ability to read both relatively wide and relatively narrow tracks in the above-described embodiments of the disclosure enables the use of servo tracks that are wider than the data tracks. This reduces the servo track writing time for the multi-disc servo track writer and also improves servo track performance.

Although various examples of multiple free layers with differing widths within magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the magnetic reproducing device with the multiple free layers of differing widths while maintaining substantially the same functionality without departing from the scope and spirit of the present disclosure. In addition, although the embodiments described herein are directed to a particular type of magnetic reproducing device utilized in a particular data storage system, it will be appreciated by those skilled in the art that the teachings of the present disclosure can be applied to other data storage devices without departing from the scope and spirit of the present disclosure.

What is claimed is:

1. An apparatus comprising:
   a read sensor comprising:
      a bearing surface;
      a first free layer (FL) comprising multiple segments that each have a width at the bearing surface, wherein a sum of the widths of different ones of the multiple segments is a first width of the first FL;
      a second FL separated from the first FL by an intermediate structure, wherein the second FL is unsegmented and comprises a second width at the bearing surface that is different from the first width of the first FL;
      a first terminal connected to a first one of the multiple segments of the first FL;
      a second terminal connected to a second one of the multiple segments of the first FL;
      a third terminal connected to the second FL; and
   control circuitry configured to apply a bias current from either the first terminal or the second terminal to the third terminal.

2. The apparatus of claim 1 and wherein:
the first FL, the second FL and the intermediate structure are configured to provide a reader resolution that corresponds to a difference between a first segment width of the first one of the multiple segments of the first FL and a second width of the second FL when the bias current is applied from the first terminal to the third terminal;
the first FL, the second FL and the intermediate structure are configured to provide a reader resolution that corresponds to a difference between a second segment width of the second one of the multiple segments of the first FL and a second width of the second FL when the bias current is applied from the second terminal to the third terminal.

3. The apparatus of claim 2 and wherein the first segment width is substantially equal to the second segment width.

4. The apparatus of claim 2 and wherein the first segment width is different from the second segment width.

5. The apparatus of claim 1 and wherein the control circuitry is further configured to apply the bias current from both the first terminal and the second terminal to the third terminal.

6. The apparatus of claim 1 and wherein the intermediate structure between the first FL and the second FL comprises a synthetic antiferromagnetic structure.

7. A disc drive comprising:
at least one rotatable disc having tracks;
a read sensor configured to read information from the tracks, the read sensor comprising:
a bearing surface;
a first free layer (FL) comprising multiple segments that each have a width at the bearing surface, wherein a sum of the widths of different ones of the multiple segments is a first width of the first FL; and
a second FL separated from the first FL by an intermediate structure, wherein the second FL is unsegmented and comprises a second width at the bearing surface that is different from the first width of the first FL;
a first terminal connected to a first one of the multiple segments of the first FL;
a second terminal connected to a second one of the multiple segments of the first FL;
a third terminal connected to the second FL; and
control circuitry configured to apply a bias current from either the first terminal or the second terminal to the third terminal.

8. The disc drive of claim 7 and wherein:
the first FL, the second FL and the intermediate structure are configured to provide a reader resolution that corresponds to a difference between a first segment width of the first one of the multiple segments of the first FL and a second width of the second FL when the bias current is applied from the first terminal to the third terminal;
the first FL, the second FL and the intermediate structure are configured to provide a reader resolution that corresponds to a difference between a second segment width of the second one of the multiple segments of the first FL and a second width of the second FL when the bias current is applied from the second terminal to the third terminal.

9. The disc drive of claim 8 and wherein the first segment width is substantially equal to the second segment width.

10. The disc drive of claim 8 and wherein the first segment width is different from the second segment width.

11. The disc drive of claim 8 and wherein the tracks on the at least one rotatable disc comprise:
at least one servo track having a servo track width;
at least one narrow data track having a narrow data track width; and
at least one wide data track having wide data track width, wherein the servo track width is greater than the wide data track width.

12. The disc drive of claim 11 and wherein the first segment width is greater than the second segment width.

13. The disc drive of claim 12 and wherein the control circuitry is further configured to:
apply the bias current from the second terminal to the third terminal when the at least one servo track is being read by the read sensor;
apply the bias current from the first terminal to the third terminal when the at least one wide data track is being read by the read sensor;
apply the bias current from the first terminal and the second terminal to the third terminal when the at least one narrow data track is being read by the read sensor.

14. The disc drive of claim 13 wherein the control circuitry and the read sensor are configured to carry out interlaced magnetic recording (IMR) on the disc, and wherein the at least one wide data track is an unsqueezed IMR bottom track, and wherein the at least one narrow track is an IMR top track.

15. The disc drive of claim 7 and wherein the control circuitry is further configured to apply the bias current from both the first terminal and the second terminal to the third terminal.

16. The disc drive of claim 7 and wherein the intermediate structure between the first FL and the second FL comprises a synthetic antiferromagnetic structure.

17. A method of forming an apparatus comprising:
forming a read sensor comprising a bearing surface;
forming a first free layer (FL) comprising multiple segments that each have a width at the bearing surface, wherein a sum of the widths of different ones of the multiple segments is a first width of the first FL;
forming a second FL separated from the first FL by an intermediate structure, wherein the second FL is unsegmented and comprises a second width at the bearing surface that is different from the first width of the first FL;
forming a first terminal connected to a first one of the multiple segments of the first FL;
forming a second terminal connected to a second one of the multiple segments of the first FL;
forming a third terminal connected to the second FL; and
forming control circuitry configured to apply a bias current from either the first terminal or the second terminal to the third terminal.

18. The method of forming the apparatus of claim 17 and wherein:
the first FL, the second FL and the intermediate structure are configured to provide a reader resolution that corresponds to a difference between a first segment width of the first one of the multiple segments of the first FL and a second width of the second FL when the bias current is applied from the first terminal to the third terminal;
the first FL, the second FL and the intermediate structure are configured to provide a reader resolution that corresponds to a difference between a second segment width of the second one of the multiple segments of the first FL and a second width of the second FL when the bias current is applied from the second terminal to the third terminal.

19. The method of forming the apparatus of claim 18 and wherein the first segment width is substantially equal to the second segment width.

20. The method of forming the apparatus of claim 18 and wherein the first segment width is different from the second segment width.

* * * * *